United States Patent
Chen

(10) Patent No.: US 10,755,438 B2
(45) Date of Patent: *Aug. 25, 2020

(54) ROBUST HEAD POSE ESTIMATION WITH A DEPTH CAMERA

(71) Applicant: BELLUS 3D, INC., Campbell, CA (US)

(72) Inventor: Shenchang Eric Chen, Los Gatos, CA (US)

(73) Assignee: BELLUS 3D, INC., Campbell, CA (US)

(*) Notice: Subject to any disclaimer, the term of this patent is extended or adjusted under 35 U.S.C. 154(b) by 80 days.

This patent is subject to a terminal disclaimer.

(21) Appl. No.: 16/148,313

(22) Filed: Oct. 1, 2018

(65) Prior Publication Data

US 2020/0105013 A1    Apr. 2, 2020

Related U.S. Application Data

(63) Continuation of application No. 15/613,525, filed on Jun. 5, 2017, now Pat. No. 10,157,477, which is a continuation-in-part of application No. 15/499,733, filed on Apr. 27, 2017, now abandoned.

(60) Provisional application No. 62/328,555, filed on Apr. 27, 2016.

(51) Int. Cl.

| G06T 7/73 | (2017.01) |
| G06T 17/20 | (2006.01) |
| G06K 9/00 | (2006.01) |
| G06F 3/01 | (2006.01) |

(52) U.S. Cl.
CPC ............ *G06T 7/75* (2017.01); *G06K 9/00255* (2013.01); *G06T 17/20* (2013.01); *G06F 3/012* (2013.01); *G06T 2207/10024* (2013.01); *G06T 2207/10028* (2013.01); *G06T 2207/30201* (2013.01)

(58) Field of Classification Search
CPC combination set(s) only.
See application file for complete search history.

(56) References Cited

U.S. PATENT DOCUMENTS

| 2008/0170077 A1* | 7/2008 | Sullivan | G06T 13/40 345/473 |
| 2012/0299912 A1* | 11/2012 | Kapur | G06F 3/017 345/419 |
| 2015/0123967 A1* | 5/2015 | Quinn | G06T 7/75 345/420 |
| 2016/0086017 A1* | 3/2016 | Rodriguez | G06K 9/00275 382/118 |

(Continued)

*Primary Examiner* — Tsung Yin Tsai
(74) *Attorney, Agent, or Firm* — Soquel Group LLC

(57) ABSTRACT

Systems and methods are provided for to estimate the pose of a human subject's head from a sequence of images received from a single depth camera by processing the images to generate a continuous estimate of the head pose in a 3-dimensional (3D) space, and to generate a 3D head model for display and further use. The subject is provided instructions to rotate their head in a first direction until a threshold angle of rotation is reached and then are provided instructions to rotate their head in a second direction. The depth camera provides a sequence of captured images which are processed to extract head meshes. After capture is complete the head meshes are merged to generate a 3D model of the subject's head.

28 Claims, 11 Drawing Sheets

(56) References Cited

U.S. PATENT DOCUMENTS

| | | | |
|---|---|---|---|
| 2016/0253807 A1* | 9/2016 | Jones | G06K 9/00221 |
| | | | 382/154 |
| 2017/0316582 A1* | 11/2017 | Chen | G06T 7/75 |
| 2017/0345183 A1* | 11/2017 | Chen | G06T 7/55 |

* cited by examiner

ROBUST HEAD POSE ESTIMATION WITH A DEPTH CAMERA

BACKGROUND

Human head pose estimation, or head pose estimation as it is commonly referred to, refers to the extraction of 3-dimensional (3D) information that estimates the location and orientation of a person's head using a sequence of digital images of the head taken from a number of angles. Head pose estimation is a step in several computer vision systems. Also, head pose estimation can provide a natural user interface in many computer applications. By knowing the head orientation and position, a computer application can display information responding to the gaze direction of a human operator. One example is a virtual reality application that can generate a view of the virtual world by tracking the viewpoint of a user. Another example is to use the head pose as input for user interactions, such as selecting text or scrolling a document, which allows physically impaired users to control the computer without using a mouse or a keyboard.

The recent introduction of low cost, commercially available depth sensing cameras makes it possible to generate 3D head models for consumer applications. Depth cameras, as they are referred to herein, provide distance, or depth, images of objects in the field of view of the camera in real-time. By taking multiple depth images of a human head from different directions and computing their head pose data, it is possible to combine the depth images to generate a 3D head model. Examples of commercially available depth cameras are KINECT by MICROSOFT, PRIMESENSE by APPLE COMPUTER, and the BELLUS3D FACE CAMERA.

REVIEW OF PRIOR ART

Robust head pose estimation remains a challenging problem. Prior art methods largely fall into one or more of the following categories:

(1) Methods that use special markers on a user's face to generate head pose information. These methods, while used extensively in motion capture, are not suitable for consumer applications. They often require the use of multiple cameras, carefully calibrated in a studio environment, and the videos are usually processed offline, not real time.

(2) Methods that use facial feature tracking to obtain the head pose information. These methods typically don't work for a wide range of head poses as some or most facial features disappear when the head turns away from the camera. They are also not very accurate as facial features often change with facial expressions and may be affected by lighting conditions. They also don't work well when there is more than one face presence or a face is partially occluded. Some methods require the use of a second camera to overcome these limitations.

(3) Methods that require training or prior training data: These methods can achieve a higher level of accuracy, but they often require a large set of training data captured from many subjects in difference head poses. Some methods also require a user to go through a training session first.

(4) Those that use GPU to achieve real time performance: To achieve real time performance, some methods require the use of a specialized graphic processor (GPU).

Use of the technology to generate 3D head models for consumer applications such as sharing, printing and social networking has been hindered by relatively cumbersome approaches to capturing head pose data. Thus, there is a need for a system and method that extracts human head pose in order to create a 3-dimensional model of a head to be used for consumer applications. For example, some consumer applications direct a user to wave or move a depth camera around the head; but this approach requires an additional operator to perform the scan. What is needed is a solution that allows a user to perform self-scanning by turning his/her head in front of a depth camera in order to capture depth images from different directions.

Thus, there is an opportunity to use low cost depth cameras to generate 3D head models for consumer applications. It is with respect to these considerations and others that the present invention has been made.

SUMMARY OF THE DESCRIPTION

Various embodiments of the subject invention cover systems and methods to estimate the pose of a human subject's head from a sequence of images received from a single depth camera by processing the images to generate a continuous estimate of the head pose in a 3-dimensional (3D) space, and to generate a 3D head model for display and further use.

The invention includes a method for estimating head pose in which the subject is directed to rotate their head in a first direction until a threshold angle of rotation is reached and then to rotate their head in a second direction. The method automatically detects when the subject's head is facing in an acceptable frontal position and then provides a first set of instructions to the subject to rotate his/her head in a first direction. The method automatically detects when the threshold rotation angle is reached in the first direction and then provides a second set of instructions to the subject to rotate his/her head in a second, opposite, direction.

In certain embodiments, the following method is employed for processing successive frames of data: (1) an initial frame, or image, that includes depth and color data is captured with the user facing the camera and established as the initial reference frame; (2) the head region is identified in the frame to extract a reference head mesh; (3) a second head mesh is extracted similarly in a subsequent frame; (4) the second head mesh is registered with the reference head mesh in 3D to compute a second transformation matrix that aligns both meshes. The transformation matrix also yields rotation and translation head pose information for the second head mesh in relation to the reference frame. This sequence of steps repeats until a halt condition or a rotation angle threshold is reached. Then a new reference frame is selected, a new reference head mesh is extracted, and the previous steps are repeated. After all head meshes have been extracted they are merged to create a 3D model of the subject's head.

To extend the head pose estimation range, an additional reference frame is added automatically when the user's head rotation exceeds certain angle. Subsequent frames are registered with the reference frame that has the closest estimated orientation.

Certain embodiments include the detection and recovery from tracking failures, saving of the head mesh data of a user, and auto recognition and tracking of a returning user.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Preferred Embodiment, which is to be read in association with the accompanying drawings, wherein.

Figure 1A:
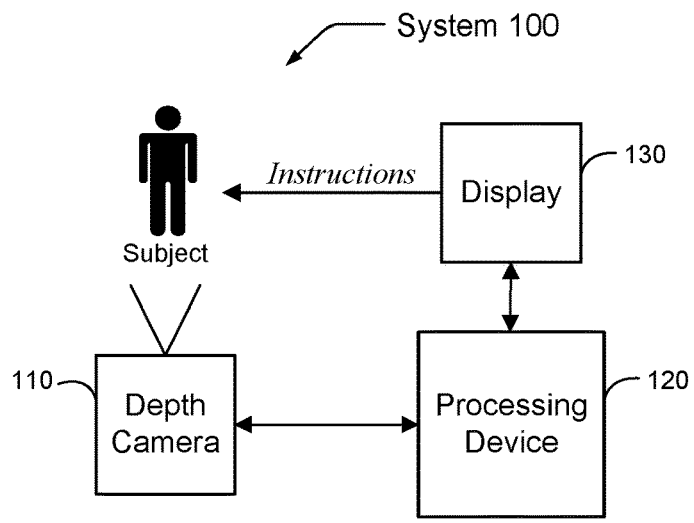
FIG. 1A shows an embodiment of a head pose estimation system in which a depth camera is connected to a processing device and the processing device is connected to a display.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, business methods or devices. Accordingly, the present invention may take the form of an entirely hardware embodiment, an entirely software embodiment or an embodiment combining software and hardware aspects. The following detailed description is, therefore, not to be taken in a limiting sense.

As used herein the following terms have the meanings given below:

Depth camera, also known as depth sensing camera may include structured-light, active or passive stereo, or time-of-flight cameras—provides a sequence of distance, or depth, images of objects in the field of view. For purposes of the subject invention it is assumed that the depth camera generates both depth or range information and color information at video frame rates of at least 5 frames per second (fps). If the frame rate is substantially faster or slower than the subject invention will compensate appropriately. Typically, both color and depth data are provided as two-dimensional frames, or arrays, of pixels. Typically, color data is in the RGB color space. Depth information may be characterized in a variety of ways, such as millimeters of distance from the camera to an object. Depth data may also indicate whether a pixel is closer than a minimum range value or farther than a maximum range value.

Subject or user—a person whose head pose is estimated based on sensor input data from a depth camera. In certain embodiments, the subject moves his/her head in a predefined manner during the capture phase.

Generalized Operation

The following description is based on the case of tracking a single user's head to generate the head pose information. It is also possible to track multiple users' heads concurrently using the same method. It should also be evident, with some change of initialization parameters, to configure the system to track non-human heads or other body parts, such as a human hand. Further, the description covers the case where during capture the user moves their head first to one side and then to another to create a frontal, side-to-side, model of the user's head. It may be appreciated by one skilled in the art that the same technique can be used in the case where a user moves their head upward and downward, or in any combination of head movements in a single pass or in multiple passes.

The operation of certain aspects of the invention is described below with respect to FIGS. 1-6.

Figure 1B:
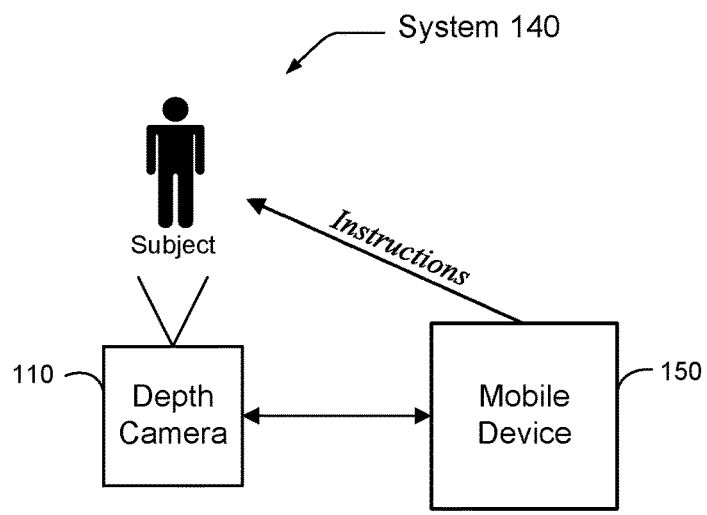
FIG. 1B illustrates an embodiment of a head pose estimation system in which a depth camera connects to a mobile device.
Figure 1C:
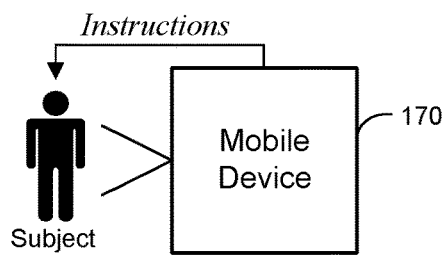
FIG. 1C illustrates an embodiment of a head pose estimation system in which a mobile device includes a depth sensor, a processor, static memory for storing program code and data and a display.

FIGS. 1A-C present three different embodiments of a system that captures head pose data using a depth camera and stitches successive photos or video frames to create a model of the subject's head. FIG. 1A shows an embodiment of a system 100 in which a depth camera 110 is connected to a processing device 120 and the processing device 120 is connected to a display 130. Depth camera 110 may be a separate camera with a depth feature or a specialized depth camera. Processing device 120 may be a personal computer, tablet computer, mobile device or other computer system with a processor and non-transitory memory for storing program instructions and data. Display 130 is connected to processing device 120 wirelessly or using a connector such as a DVI cable or APPLE Display Connector (ADC). This embodiment covers the case where a depth camera is attached to a separate personal computer or laptop computer.

FIG. 1B illustrates an embodiment of a system 140 in which a depth camera 110 connects to a mobile device 150. The connection may be wireless, via a USB connector, an APPLE LIGHTENING connector, or the like. In this case, mobile device 150 has an integrated display and performs processing of images received from depth camera 110. Mobile device 150 is typically a commercially available mobile device or smartphone such as an APPLE IPHONE or a SAMSUNG GALAXY. Alternatively, it may be a laptop computer, personal computer, gaming device, or other device that has an integrated display.

FIG. 1C illustrates an embodiment of a mobile device 170 that includes depth sensing, a processor, static memory for storing program code and data and a display. Thus, mobile device 170 integrates all elements necessary to capture head pose, generate a 3D model, interact with the subject during the capture phase and present results on an integrated display. Mobile device 170 is typically a commercially available mobile device that integrates a depth camera. It is anticipated that such mobile devices will soon be commercially available. Alternatively, it may be a laptop computer, personal computer, gaming device, or other device that has an integrated display.

In each of FIGS. 1A-C, the processing device (i.e. processing device 120 or mobile device 150 or mobile device 170) displays instructions and visual feedback to a subject whose face is being captured to estimate head pose. Instructions may also be auditory and haptic.

Figure 2A:
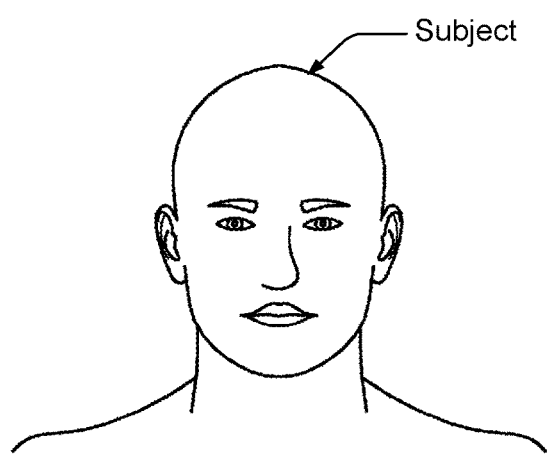
FIG. 2A shows a human subject.
Figure 2B:
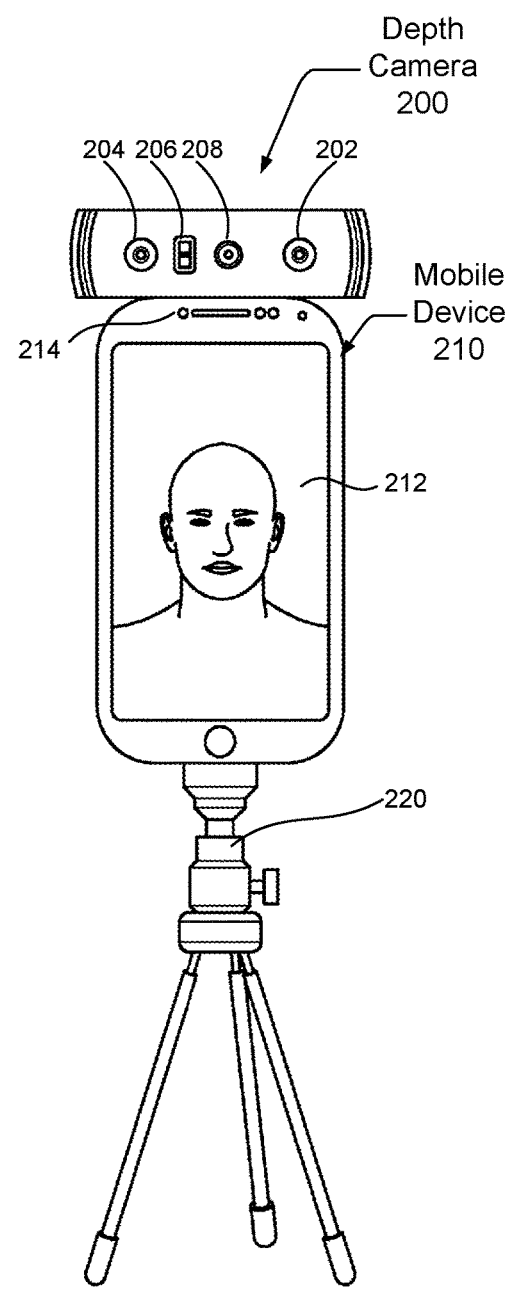
FIG. 2B illustrates one embodiment of a system in which a depth camera is attached to a mobile device, which is mounted on a tripod.

FIG. 2A shows a human subject. FIG. 2B shows an embodiment of system 140 in which a depth camera 200 is attached to a mobile device 210 which is mounted on a tripod 220.

In certain embodiments, depth camera 220 includes 2 infrared sensors 202, 204, an infrared laser projector 206 structured for infrared light and a color sensor 208. In certain embodiments, the system works with color data from a color sensor 214 integrated into mobile device 210. The infrared sensors and projector provide a depth map of a scene, that provides depth, or distance, information for a two-dimensional array of pixels that represents the field of view of the depth camera. The color sensors 208 and 214 each generate color information for each pixel, i.e. a digital image, typically in the RGB color space. Generally, the invention only requires that depth camera 220 generate a 2D array where each element or pixel in the array represents an area within the field of view of the camera and each element in the array includes depth information.

Mobile device 210 includes a display 212. Typically, the subject is facing display 212 so that he/she can view instructions and results shown on display 212. The subject follows the displayed instructions and turns his head appropriately so that his or her entire face, typically between 180 degrees and 360 degrees of rotation, is captured by the depth camera, which typically does not move.

Figure 3A:
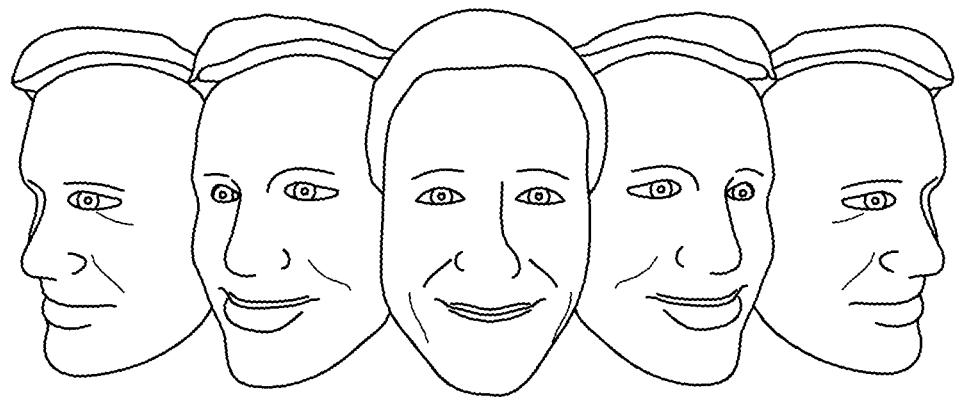
FIG. 3A shows a sequence of views of a subject's face as he turns his head from one side to another.
Figure 3B:
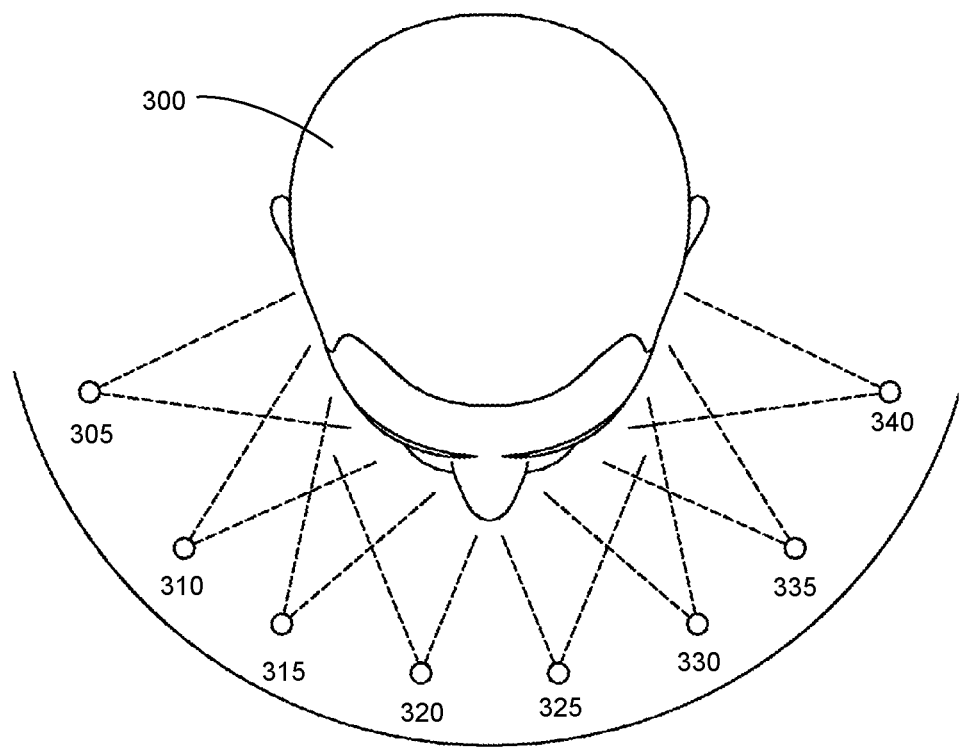
FIG. 3B is a downward looking illustration of how a sequence of overlapping views from a camera or depth camera combine to capture the face of a subject.

FIGS. 3A and 3B illustrate an embodiment of a capture process. FIG. 3A shows a sequence of views of a subject's face as he turns his head from one side to another. FIG. 3B is a downward looking illustration of how a sequence of overlapping views from a camera or depth camera combine to capture the face of a subject 300. Essentially views 305-340 capture roughly 180 degrees of the face of subject 300. The subject invention combines, or "stitches", successive frames of captured data together to create a depth map and a color map, the map is then applied to a cylinder to create a 3D model. It may be appreciated that the map can also be applied to a sphere or other geometric shape. Thus, in FIG. 3B, the 8 views illustrated in FIG. 3B are stitched together and then mapped onto a cylinder to yield a 3D model. In certain embodiments, described with reference to FIGS. 6 and 7, the successive frames or images are used to generate head meshes that are stored and then merged in a postprocessing step after the capture process is complete. In other embodiments, the head meshes are processed in real-time, i.e. as the captured data is received, to create a composite, or continuous head mesh.

Figure 4A:
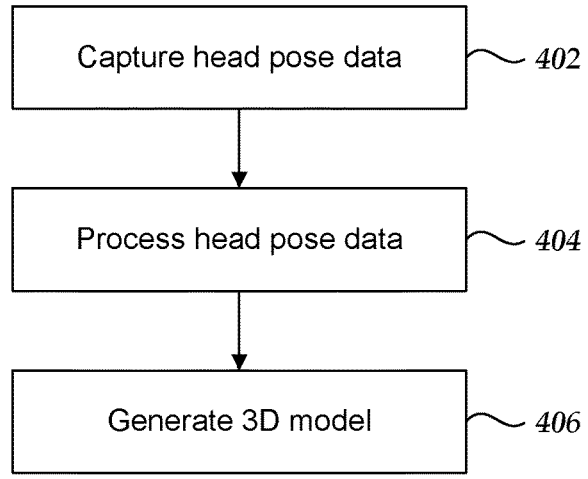
FIG. 4A provides an exemplary flow diagram of a method performed by a processing device or mobile device to capture and generate a 3D model of a subject's head.

FIG. 4A provides an exemplary flow diagram of a method 400 performed by a processing device or mobile device to capture and generate a 3D model of a subject's head. At step 402 a subject's head is captured by a depth camera and color and depth data is provided to a processing device or mobile device for processing.

At step 404 the depth and color data is processed to create head meshes.

At step 404 the head meshes are merged to create a 3D model. The 3D model may be displayed, printed or provided to the subject for sharing via social media or email, or for other purposes.

It may be appreciated that the data captured at step 402 is a series of frames, each frame capture a slightly different angle of the subject head. In certain embodiments, at step 404 the frame data is processed in real time and real time display information is provided to the subject.

Figure 4B:
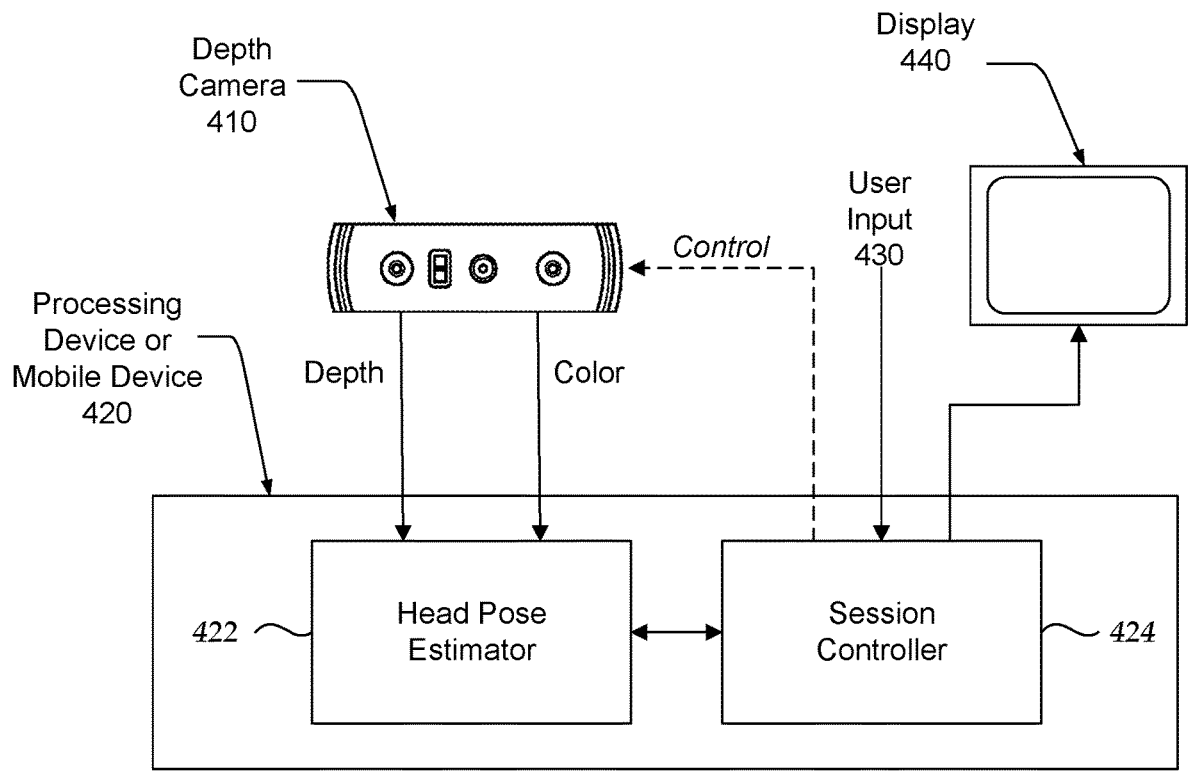
FIG. 4B is an exemplary block diagram that illustrates the software modules that operate in a processing device or mobile device that perform head pose estimation and session control in order to construct a 3D model of a subject's face.

FIG. 4B is an exemplary block diagram that illustrates the software modules that operate in a processing device or mobile device 420 (henceforth "device 420") that perform head pose estimation and session control in order to construct a 3D model of a subject's face. This block diagram is valid for each of the system configurations illustrated in FIGS. 1A-1C.

A depth camera 410 capable of capturing both color and depth data connects to and provides depth data and color image data to device 420. Device 420 processes the data and displays results and instructions on a display 440. Device 420 is a computing device with a processor and non-transitory memory for storing program code and data. It also includes data storage. In the configurations illustrated in FIGS. 1A-1C device 420 corresponds to processing device 120, mobile device 150 and mobile device 170, respectively. As discussed with reference to FIG. 1C depth camera 410 may be integrated with device 420. Likewise display 440 may be integrated with processing device 420, as is the case with mobile device 150 and 170.

A software module referred to as head pose estimator 422 runs on device 420 and processes the depth and color data received from depth camera 410 in real time to generate 6 degree-of-freedom (three rotational and three translational) head pose data. Head pose estimator 422 may optionally display a video of the user's head superimposed with directional axes showing the orientation of the head, generated by head pose estimator 422 on display 440.

A software module referred to as session controller 424 runs on device 420 and uses the head pose data created by head pose estimator 422 to control functions related to management of a session. A session refers to capturing head pose data for a subject, processing the data and providing a 3D model to the subject for exploitation. In certain embodiments, head pose estimator 422 and session controller 424 may run on different computer devices. Session controller 424 may obtain the head pose data from head pose estimator 422 in real time via an API (application programmer's interface), or via a local or remote network connection, in the case that session controller 424 runs on a different computer than head pose estimator 422.

In a typical use case, session controller 424 launches head pose estimator 422 and requests it, via an API or a network connection, to start a tracking session during which head pose data is captured, processed and returned to session controller 424 in real-time. Real-time in this case is typically 30 Hz, i.e. the data is processed at the same rate that frames are received. In certain embodiments, the frame rate may be less than 30 fps (frames per second) and in certain embodiments the frame rate may be greater than 30 fps. Session controller 424 may terminate or restart a tracking session as needed.

To start a tracking session, head pose estimator 422 requires a subject to face depth camera 410 to capture an initial reference frame ("Initial Reference Frame"), to which subsequent frames are compared. Head pose estimator 422 can be configured to start the capture and processing of incoming frames of data, referred to herein as tracking, automatically or manually. In the automatic case, head pose estimator 422 continuously monitors the incoming data to detect presence of a human face in the input video stream of frames. When a stable frontal face is detected for some preset period of time (e.g 2-5 seconds), then tracking starts. In the manual case, the user is instructed to face the depth camera and then press a key or to click a button on the screen to initiate the tracking.

FIGS. 5A-5E provide an embodiment of a user interface 500 that instructs a subject to turn his/her head in a prescribed manner in so that a depth camera can efficiently capture a complete face. The approach relies on a configuration such as that illustrated in FIG. 2 and an approach as illustrated in FIGS. 3A-3B in which the depth camera 200 remains fixed while the subject turns his head first in a prescribed manner so as to allow the depth camera to capture a sequence of images of one side of the face and then the other.

Figure 5A:
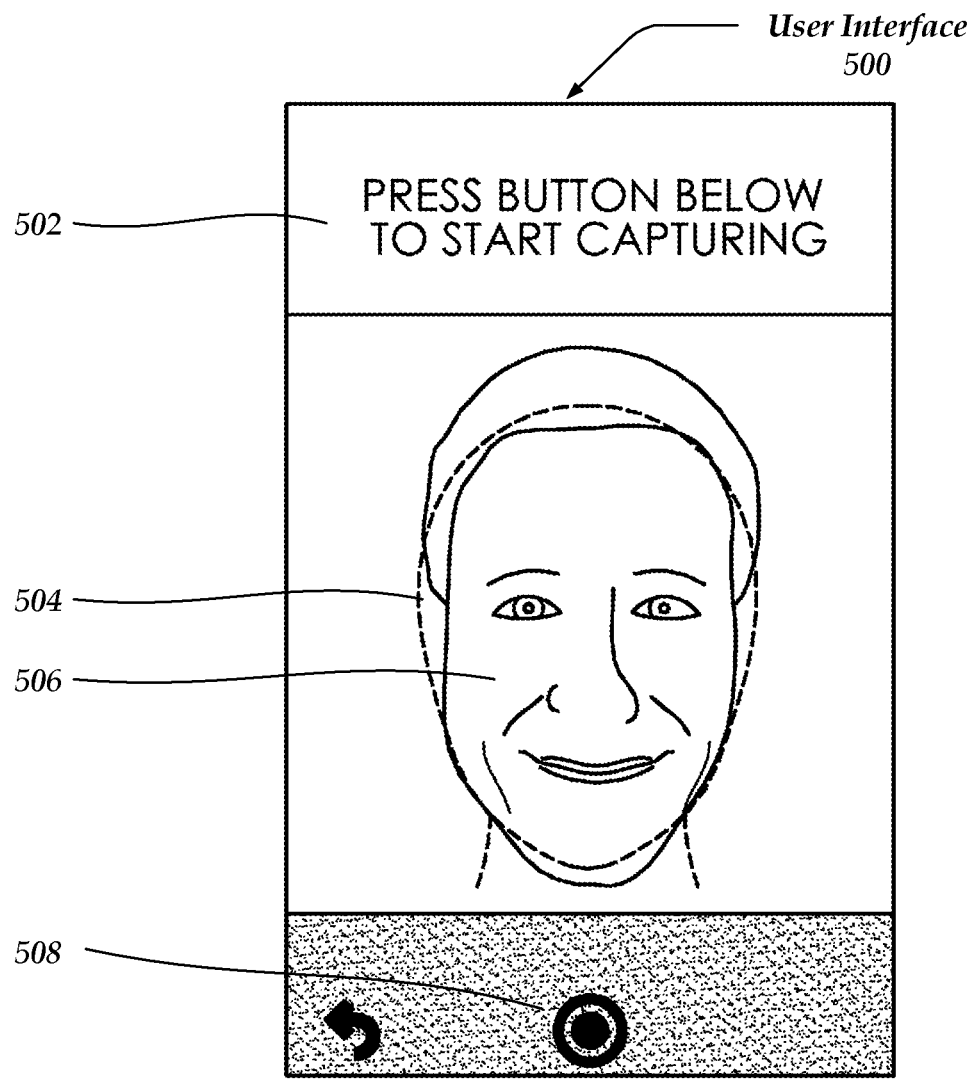
FIG. 5A provides an embodiment of a user interface that instructs a subject to press a control in order for depth camera to begin capturing scene data.

As illustrated in FIG. 5A, an initial set of instructions 502 appears that instructs the user to press a control 508 in order for depth camera 410 to begin capturing scene data. The subject's face 506 appears on display 440. Generally, the method will wait until the subject positions himself/herself in front of the camera such that their face roughly fits within a contour 504 and remains in that position for a short period of time, e.g. 2-5 seconds. Additional instructions may be provided as necessary to instruct the subject to correctly position himself/herself. Additional controls such as a "back" control may also be available at this point.

Figure 5B:
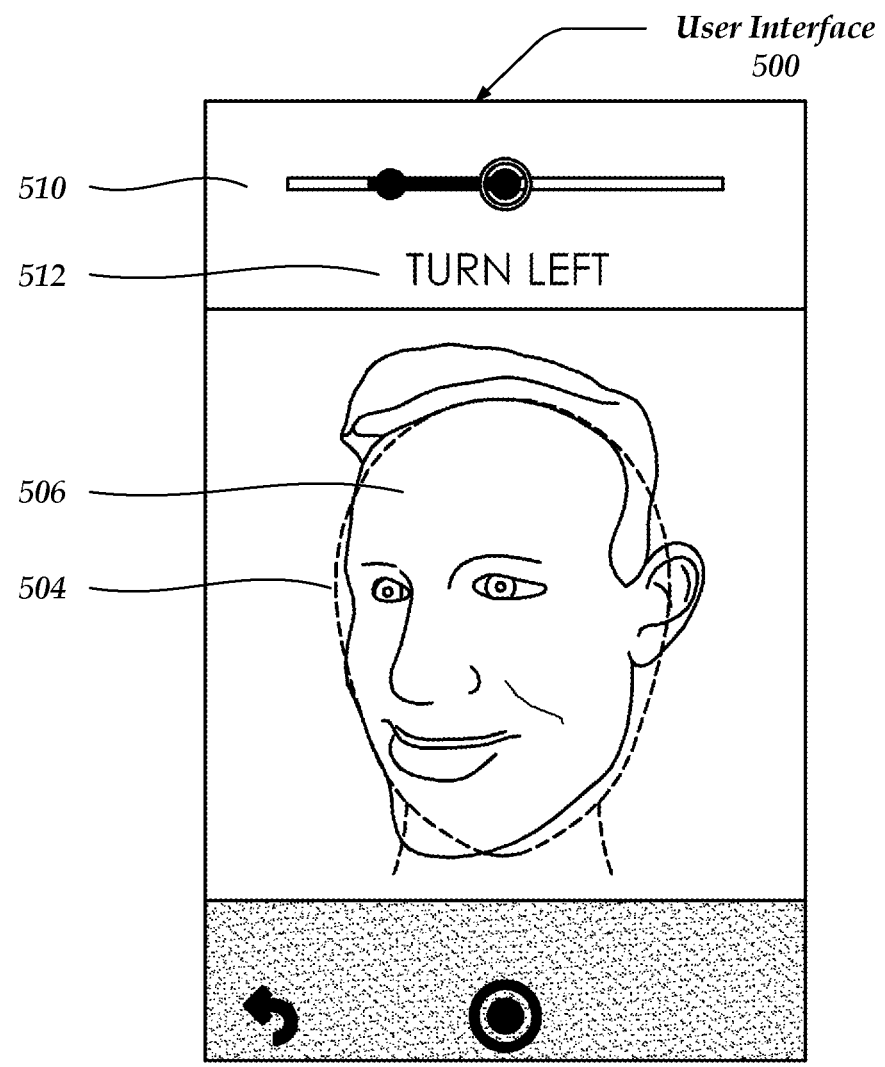
FIG. 5B provides an embodiment of a user interface that presents the subject with instructions to turn his/her head to the left.

As illustrated in FIG. 5B, after pressing control 508 the subject is presented instructions 512 to turn his/her head to the left. As the subject turns his/her head to the left: (1) a progress bar 510 indicates what portion of the face has been captured thus far, and (2) the face of the subject 506 as seen by the depth camera is continuously updated. Generally, it is assumed that the depth camera receives a continuous feed of images at 30 fps. If the subject's face is within contour 504 then this operation continues until the left side of progress bar 510 is full, which occurs when the subject has turned their head approximately 90 degrees to the left. In other embodiments, a user may continue to rotate, for example by swiveling on a chair in order to capture the back of their head.

Figure 5C:
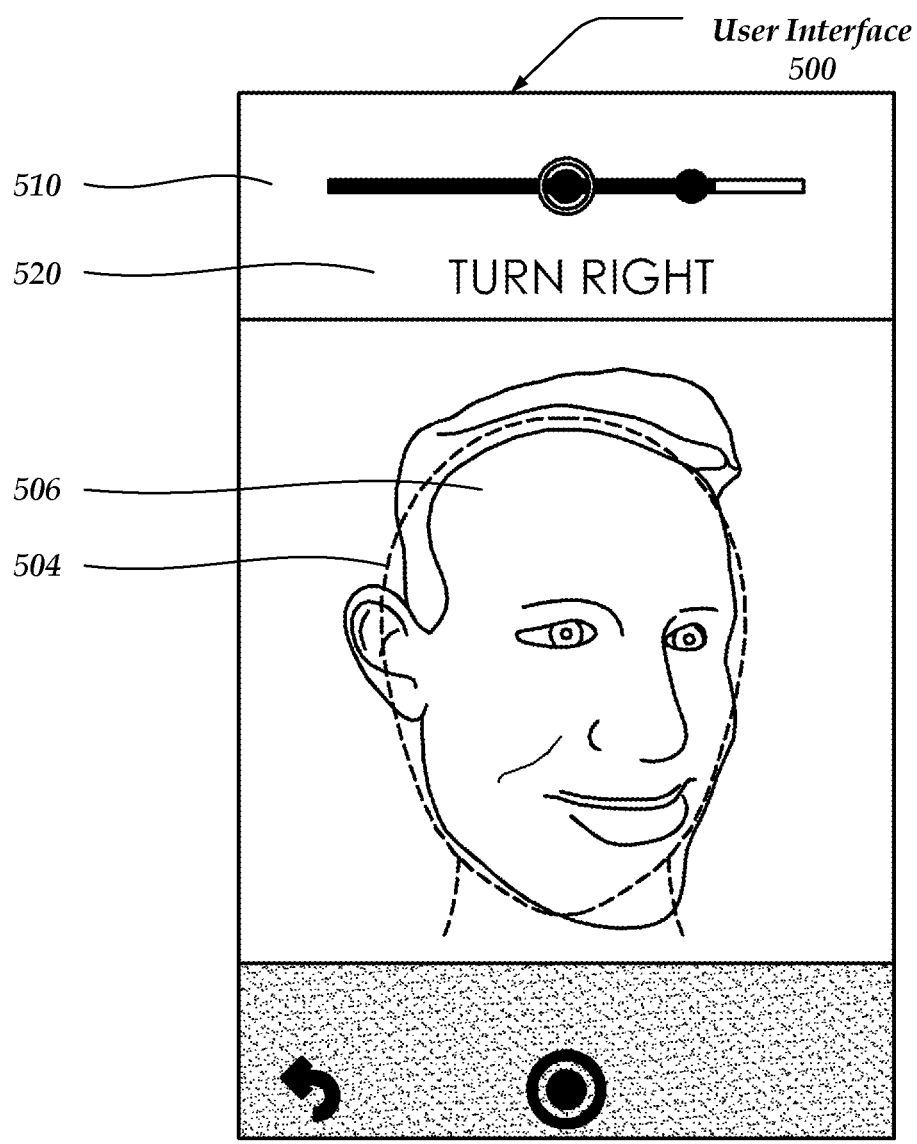
FIG. 5C provides an embodiment of a user interface that instructs the subject to turn his/her head to the right.

As illustrated in FIG. 5C, when the subject has turned his/her head approximately 90 degrees to the left a message 520 appears on the display instructing the subject to turn his/her head to the right. At this point the left side of progress bar 510 indicates that capture on the right side of the face, i.e. the side of the face turned towards depth camera 410 when the user turns their head to the left, has completed. The display of subject's face 506 continues to update in real-time as depth camera 410 now captures the right side of the subject's face.

Figure 5D:
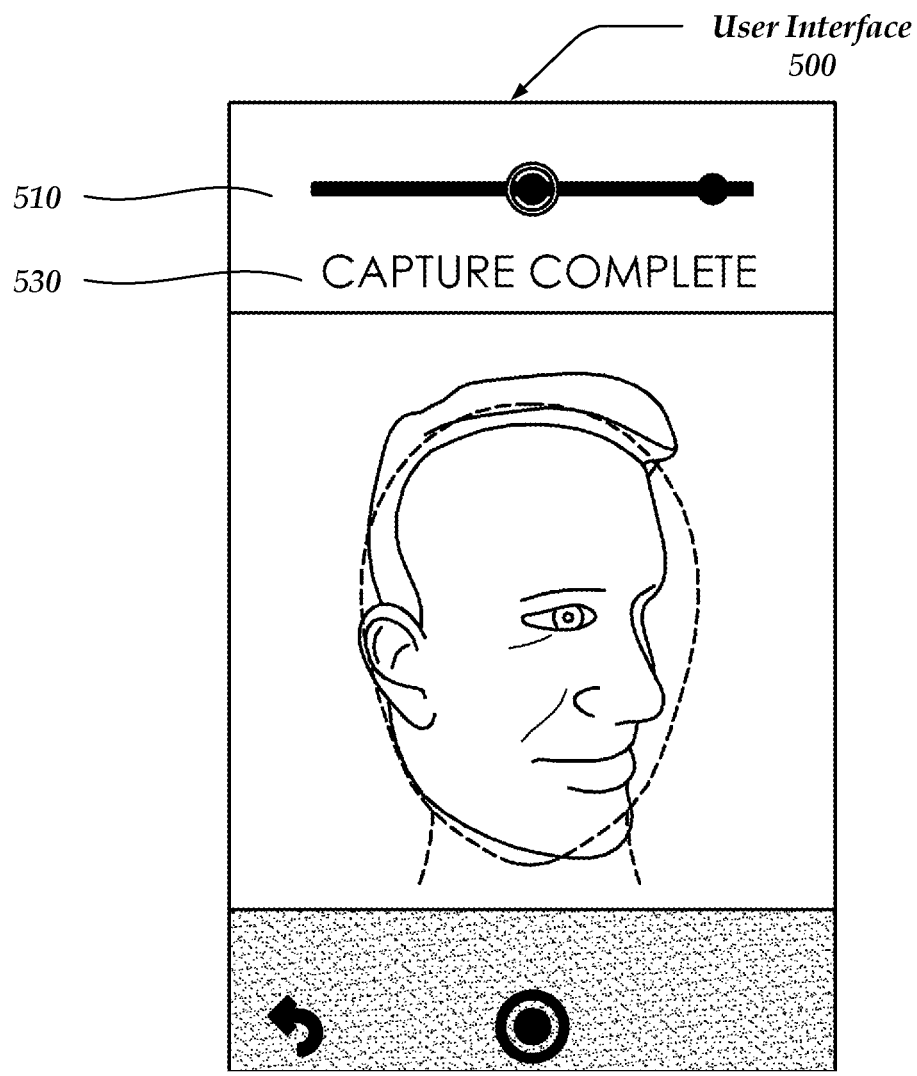
FIG. 5D provides an embodiment of a user interface in which a message appears that indicates that capture is complete.

As illustrated in FIG. 5D, when the subject has turned approximately 90 degrees to the right a message 530 appears on the display indicating that capture is complete. At this point progress bar 510 indicates that facial capture by depth camera 410 has completed.

Figure 5E:
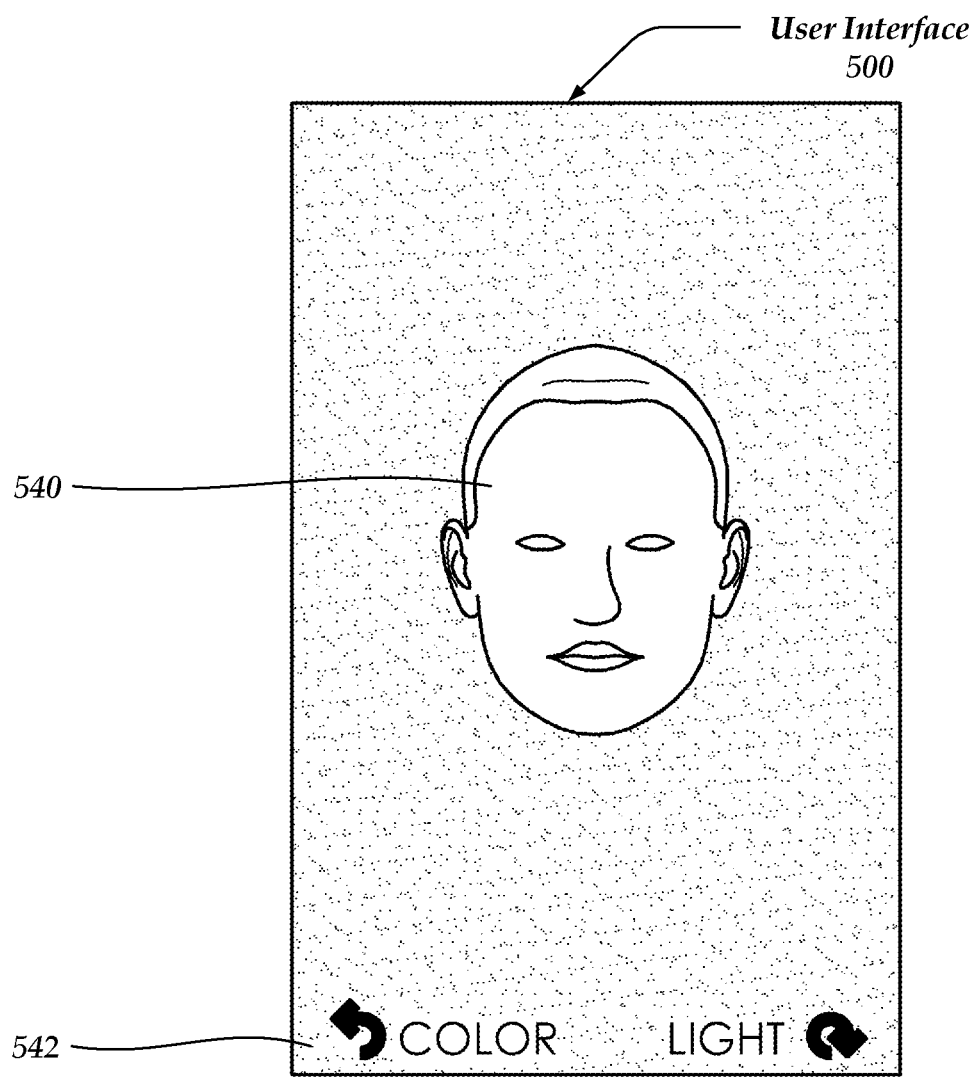
FIG. 5E provides an embodiment of a user interface that displays a complete 3D head model.

As illustrated in FIG. 5E, after capture is complete, head pose estimator 422 completes its calculations and can provide a complete 3D head model to session controller 424 for display to the subject via display 440. This step is optional but is likely to be desirable in most consumer applications. A variety of user-controls 542 can be provided to the subject. For example, color controls can be used to add, subtract, or filter color values. Additionally, a lighting control may be provided that enables the user to control lighting on the 3D model, for example to shift the location of the lighting source, type of light, intensity, etc.

Figure 6:
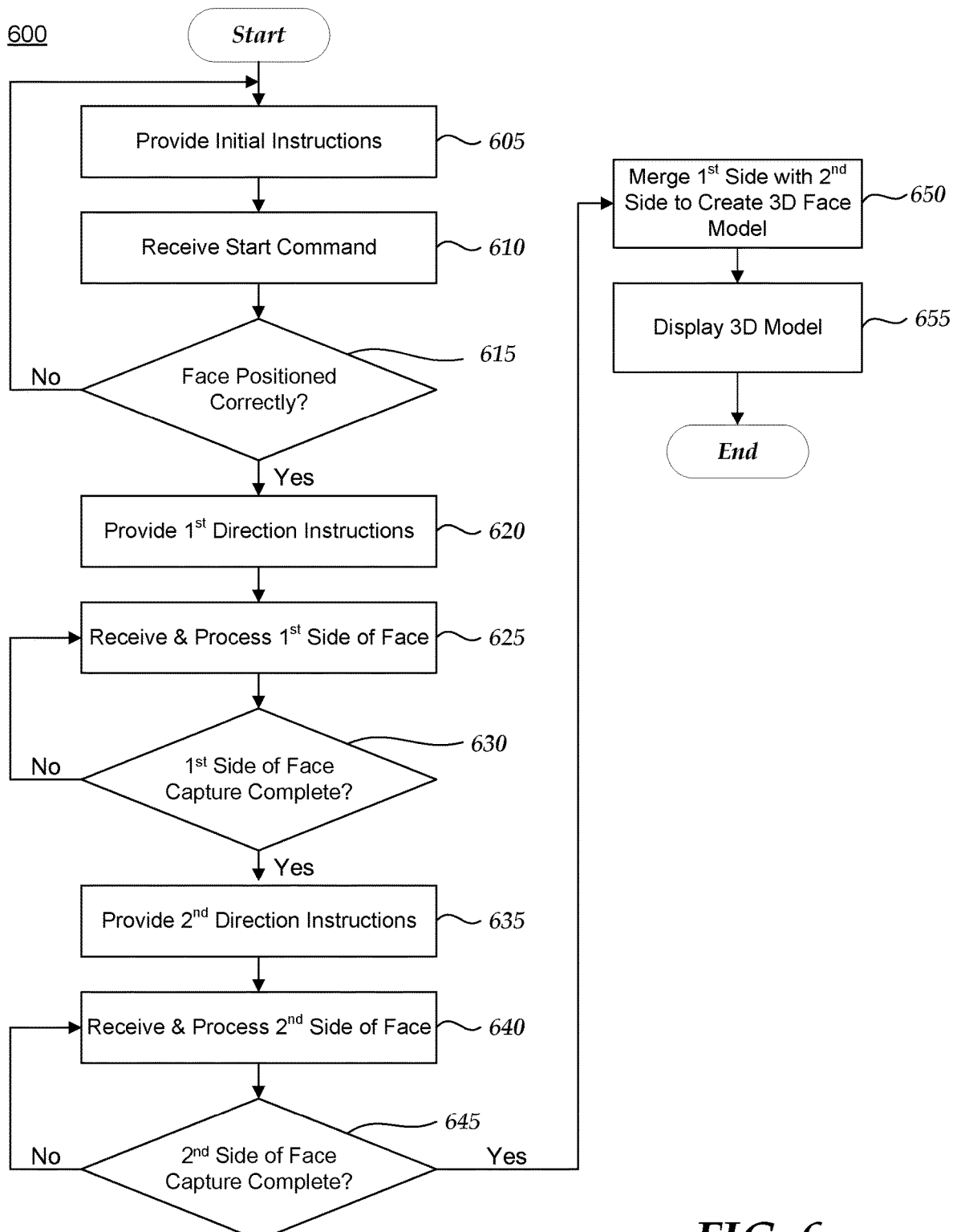
FIG. 6 is a flow diagram that illustrates one embodiment of a method for capturing head pose data of a subject from a depth camera.
Figure 7:
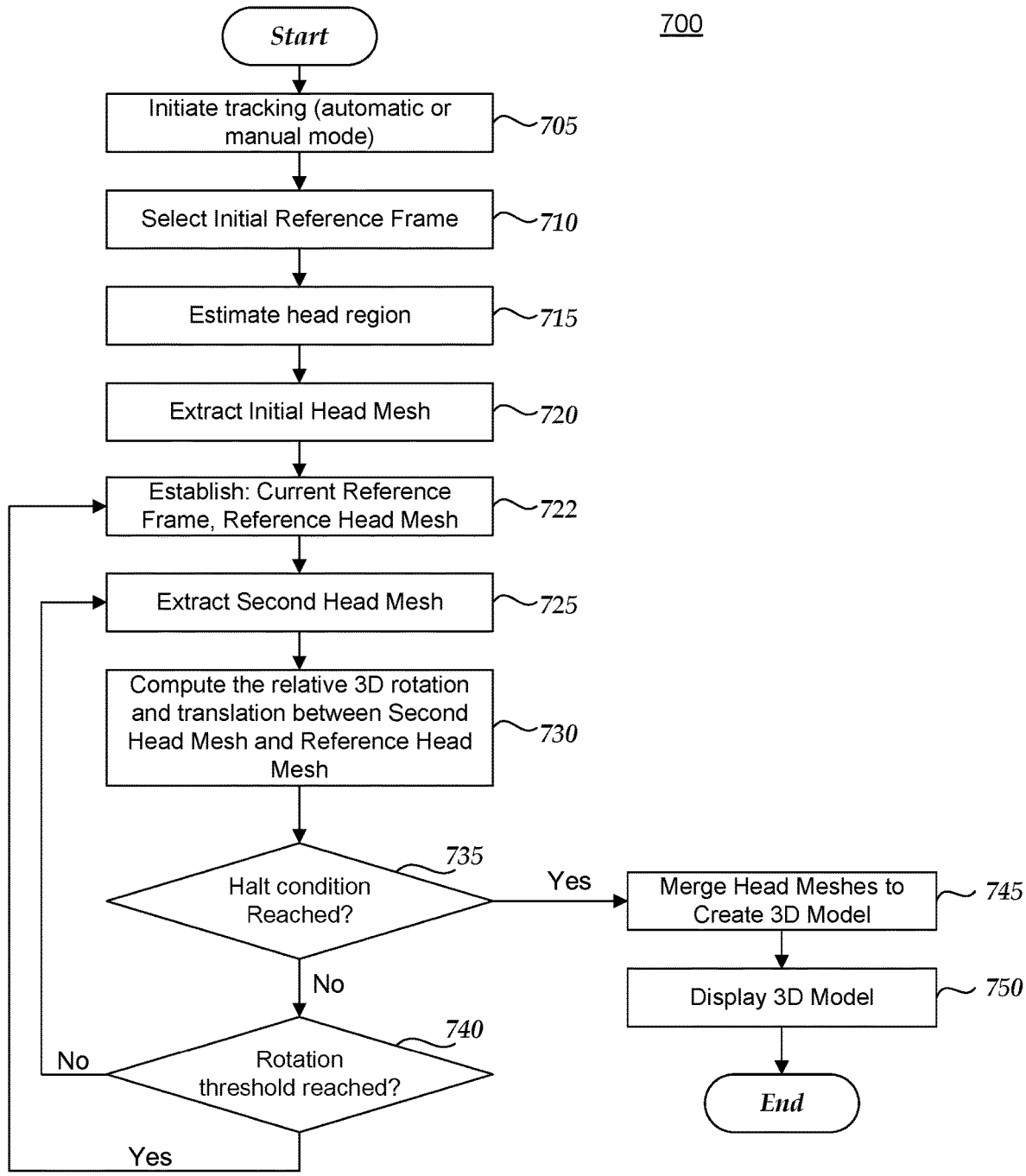
FIG. 7 is a flow diagram that depicts one embodiment of a method for estimating head pose.

FIGS. 6 and 7 are flow and component diagrams in which each graphical element, including rectangles, cylinders, and triangles, can be implemented by computer program instructions. These program instructions may be provided to a processor and then executed by the processor, thus creating means for implementing the actions represented by the graphical element. The computer program instructions may be executed by a processor to cause a series of operational steps to be performed by the processor to produce a computer-implemented process such that the instructions, which execute on the processor to provide steps for implementing the actions represented by the graphical element. Some of the computer program instructions may be performed in parallel, or across more than one processor, such as might arise in a multi-processor computer system. In addition, the actions represented by one or more graphical elements may also be performed concurrently with actions represented by other graphical elements, or even in a different sequence than illustrated without departing from the scope or spirit of the invention. It will also be understood that the actions represented by each graphical element and by combinations of graphical elements can be implemented by special purpose hardware-based systems that perform the specified actions or steps, or combinations of special purpose hardware and computer instructions.

FIG. 6 is a flow diagram that illustrates one embodiment of a method 600 performed by device 420 to capture head pose data of a subject from a depth camera. Method 600 generally conforms to the sequence of interactions and processing described with reference to FIGS. 5A-5E, hereinabove. However, method 600 is more general and is independent of the specific user interface design, the type of depth camera, and the underlying technology used to process captured head pose data. Specifically, while method 700 may be used to process frames of data generated by method 600 other methods may be used for processing head pose data without departing from the spirit or scope of the subject invention.

A step 605, device 420 provides initial instructions to the subject. Typically, device 420 causes starting instructions to the subject about how to position their head correctly to be presented on display 440 and instructs the subject to press a start control to initiate capture. In certain embodiments, these initial instructions are not required and device 420 automatically detects that a subject's face is correctly positioned in the field of view and moves to step 620.

At step 610, device 420 receives a command to start the capture of head data, based on input from the subject such as clicking a menu item or selecting a control. Again, in embodiments of the subject invention this step may be automated and once device 420 detects that a subject's head is positioned correctly processing flows to step 420. Thus, step 610 can be considered as an optional step.

At step 615, device 420 determines whether the subject's face is correctly positioned. For example, as illustrated in FIG. 5A a subject's face may be required to fall substantially within contour 504. Generally, at any point of method 600 it may be required that the subject's face be positioned so that it is substantially within contour 504. Essentially, this means that the face is centered and wholly within the field of view of depth camera 410. If a subject's face at any point move's outside contour 504, i.e. it moves outside the field of view of depth camera 410, then corrective action such as starting over, or displaying a message directing the subject to reposition his/her head may be taken. If the face is determined to be correctly positioned then processing continues at step 620. If the face is not correctly positioned, then there are several alternatives: (1) in certain embodiments, processing returns to step 605 and the initial instructions to the subject are repeated, potentially with some additional information; (2) processing remains at step 615 while the subject makes attempts to position their face correctly.

At step 620 a first set of direction instructions is provided to the subject. Typically, device 420 causes instructions to the subject to be presented on display 440 that instruct the subject to turn their head in a first direction. In example user interface 500 the subject was instructed first to turn his/her head to the left. However, in other embodiments the subject may be instructed to first turn his/her head to the right or to move the head upwards or downwards. If the user is seated on a swivel chair the instructions may suggest that the subject swivel the chair in one direction or another.

At step 625, as the subject moves his/her head as instructed at step 620, processing device 420 receives a sequence of depth and/or color images from the field of view of the depth camera. As it receives the image sequence, device 420 computes a sequence of head meshes and their 3D rotational and positional transformation (head pose parameters) relative to an initial, or reference head mesh which is extracted from the first frame in the sequence of received images. A head mesh is a 3D surface mesh of polygons extracted from a depth image by connecting adjacent pixels in the depth image. Each depth image pixel's X, Y coordinate together with its depth value can be interpreted as or transformed into a 3D vertex in a head mesh. A continuous head pose estimate of the current image from the previously received images can be computed from their head meshes, as described hereinbelow with reference to FIG. 7. Typically, device 420 provides continuous updates to display 440 at this step, including showing the sequence of image. For example, the received images may be displayed to the subject and a progress bar may be updated. Other types of real-time feedback may also be provided such as visual or auditory encouragement. One embodiment of a method for computing a continuous head pose estimate is described with reference to FIG. 7.

At step 630, while images from depth camera 410 are being received, device 420 analyzes the images to determine if capture of the 1$^{st}$ side of the face is complete. This can occur if (1) the face has turned to a predetermined angle from the starting position, (2) the face stops turning for a pre-determined amount of time, e.g. 5 seconds, or (3) the face starts turning, back, i.e. in the opposite direction. As an example of case 1, if the starting position, in which the subject is facing front, with zero head rotation, is considered to be (x=0, y=0, z=0) in a 3D coordinate system then the finishing point may be (x=0, y=90, z=0), i.e. the head is turned 90 degrees. In this coordinate system, typically used for computer vision, the y axis represents degrees of yaw, moving the head right to left, the x axis represents degrees of pitch, moving the head up and down, and the z axis represents degrees of pitch, the tilt of the head. When capture of the 1$^{st}$ side of the face is complete processing continues at step 635. Generally, steps 620, 625, and 630 625 are performed continuously, in real-time, for every successive frame in the first sequence of images received from depth camera 410. Further, device 420 may provide continuous updates to display 440 at this step. For example, a progress bar may be updated and the received images may be displayed to the subject. Other types of real-time feedback may also be provided, including visual or auditory information.

At step 635, a second set of direction instructions are provided to the subject. Typically, device 420 causes instructions to the subject to be presented on display 440 that instruct the subject to turn their head in a second direction. In example user interface 500, the subject was instructed first to turn his/her head to the left and second to turn his/her head to the right.

At step 640, as the subject moves his/her head as instructed at step 635, processing device 420 receives a sequence of depth and/or color images from the field of view of the camera. As in step 625, as it receives the image sequence, device 420 computes a sequence of head meshes and their head pose estimates. Typically, device 420 provides continuous updates to display 440 at this step, including showing the sequence of images. For example, the received images may be displayed to the subject a progress bar may be updated. Other types of real-time feedback may also be provided such as visual or auditory encouragement.

At step 645, while images from depth camera 410 are being received, device 420 analyzes the images to determine if capture of the 2nd side of the face is complete. This can occur if (1) the face has turned to a predetermined angle from the starting position, (2) the face stops turning for a pre-determined amount of time, e.g. 5 seconds, (3) the face starts turning, back, i.e. in the opposite direction, (4) device 420 receives an input command to halt the head pose estimation process. As an example of case 1, if the starting position is considered to be (x=0, y=0, z=0), where the units are degrees, then the finishing point may be (x=−90, y=0, z=0), where x is the horizontal axis in which motion occurs and z refers to up and down, or latitudinal, motion of the head. When capture of the 2nd side of the face is complete then the face capture is complete and processing continues at step 650. Generally, the sequence of steps 640, 645 and 650 and 645 are performed for each successive frame or image received in the second sequence of images from depth camera 410.

At step 650 the head meshes that correspond to the first side of the face and the head meshes that correspond to the second side of the face are combined or merged using their head pose estimate to compute and remove overlap and to provide a single 3D model of the entire face. One method, method 700, for performing this merging is described with reference to FIG. 7. In method 700, a head mesh is extracted for each received image and the entire set of head meshes are merged at step 650 to create a composite head mesh, also referred to as a face model of 3D model.

At step 655 the 3D model created in the preceding step is optionally displayed on display 440. Other types of actions may be performed by the user but capture of the facial data and estimation of head pose is complete at this point.

Generalizing the Capture Method

It may be appreciated that while method 600 describes one method for capturing and processing a first side of the face followed by a second side of the face that other capture sequences may be implemented without departing from the spirit and scope of the subject invention. For example, in one embodiment, first the right side of the face is captured, then the left side, then the subject rotates his head upward and then downward to capture the below-the-chin region and the top of the head respectively. In other embodiments, the right side of the face, left side and then the top of the head are captured. Generally, the subject invention enables the capture of arbitrary sequences of overlapping images and merges the sequences of images after the capture process terminates to generate a 3D model of the subject.

It may further be appreciated that while method 600 confines itself to the capture of one side of the face and then the next and includes initial, first and second directions to the subject, in other embodiments there may be more or less than these three instructions. In certain embodiments, there may be an expert mode where no instructions are provided and the subject simply moves their head in a sequence. Thus, in the more general case, at step 645 device 420 analyzes the images and may determine that the entire capture sequence has completed, i.e. that all necessary images have been captured and that corresponding head meshes have been created.

Finally, it may be appreciated that while method 600 suggests that the subject must slowly rotate his/her head during the capture process that in certain embodiments the subject may remain motionless while the depth camera revolves around the subject's head.

Head Pose Estimation

The goal of head pose estimator 422 is to compute 3 rotational and 3 translational head pose parameters that correspond to the orientation and location of the head in 3D relative to a Reference Frame. The following describes the steps head pose estimator 422 performs to generate the head pose data from the color and depth images captured by a depth camera.

Estimation with Initial Reference Frame

FIG. 7 is a flow diagram that depicts one embodiment of a method performed by device 420 for estimating head pose. The method operates on a sequence of received frames provided by depth camera 410. For example, the method works with a sequence of frames captured using method 600, described hereinabove with reference to FIG. 6. However, method 700 is more general and can work with received frames captured using other methods.

At step 705, tracking of the received frames is initiated in either an automatic mode or a manual mode. In the automatic mode, the received frames are analyzed to detect the presence of a human face in a frontal orientation using a face detection algorithm. A face is considered in a frontal orientation when two eyes are detected inside the face in a symmetrical location above the center and a nose tip just below the center of the face region. The face and the eyes are detected from the color image using a feature detection algorithm such as Haar Cascade. Note that a tutorial covering the basics of face detection using Haar Feature-based Cascade Classifiers is available at http://docs.opencv.org/trunk/d7/d8b/tutorial_py_face_detection.html. The nose tip is detected by examining the depth data inside the face region looking for the closest point with a cone shaped curvature. It should be noted that Haar Cascade detection works from a set of training data, and can be configured to use other data to detect different subjects, such as human hands or other objects, and is not limited to human faces and eyes only. This allows the proposed method to work on subjects other than human head as noted earlier. It should also be noted that the frontal face orientation is desirable because most applications prefer the head pose to be relative to the camera's orientation and the frontal face allows the reference frame and the camera's orientation to be roughly aligned. In the manual mode, the user can select the Initial Reference Frame by issuing an explicit command to initiate tracking, once the subject determines that he/she is in a frontal orientation. Although for purposes of this discussion it is assumed that the subject's initial head orientation is in a frontal position, method 700 can be easily generalized to start with the head in a different initial orientation. For example, there may be cases where the head pose should be based on a reference frame captured when the user is looking away from the camera.

At step 710, when a face is detected in a desired orientation in the automatic mode, or when the user issues a command in the manual mode, an Initial Reference Frame is captured or selected. Captured frames are assumed to include both color and depth information. The Initial Reference Frame establishes the origin of a coordinate system on which the subsequent head pose data are based. The head pose data of subsequent frames will be relative to the orientation and location of the Initial Reference Frame.

At step 715, An image-space bounding box of the head region ("Head Region Estimate") is estimated. For the Initial Reference Frame, the estimate is obtained from Haar Cascade face detection in Step 1. For subsequent frames, the initial estimate is transformed using the computed head pose data to its new location.

At step 720, an Initial Head Mesh is extracted from inside the Head Region Estimate generated at step 715. Pixels from the captured sequence of frames may belong to the head or to the background. To extract only the head pixels, pixels are removed whose depth values are greater than a predefined prescribed distance (say 4 feet) away. Next an average depth value of all the remaining pixels is used as an estimate of the distance of the head from the camera. Since some head pixels may fall outside of the Head Region Estimate, we grow the region by connecting any adjacent pixels whose depth values are within some threshold of the average depth value of the head. Finally, based on an estimate of the size of a human head, the image size of the head can be determined from the distance information included in the Initial Reference Frame. Then a bounding box is computed with the image size centered at the head pixel region. At this point, the pixel values in the frame being processed are transformed to a 3D mesh representation such that every vertex in the mesh corresponds to an X, Y, Z representation of a pixel. Further, each vertex forms a triangle with its two closest vertices to form a triangular mesh. This may be referred to as a dense mesh since no information has been eliminated. The result is a 3D polygonal mesh of vertices, each having a X, Y, and Z coordinate value, and connectivity to the nearest neighbors, which represents the head in its initial orientation, referred to as an Initial Head Mesh. The Initial Head Mesh is assigned an identity 3D transformation matrix, referred to an Initial Reference Transformation.

At step 722 the current frame being processed is defined as the Current Reference Frame, the corresponding head mesh is established as the Reference Head Mesh, and the current 3D transformation matrix is established as the Reference Transformation. This enables subsequent processing steps to be repeated whenever a new reference frame is established. Thus, for the first frame, the Initial Reference Frame is established as the Current Reference Frame, the Initial Head Mesh is established as the Reference Head Mesh, and the Initial Reference Transformation is established as the Reference Transformation. This allows the following steps, steps 725, 730, 735, and 740 to repeat across rotational intervals where the start of an interval is defined by a new Current Reference Frame, Reference Head Mesh, and Reference Transformation.

At step 725, the next frame in the sequence of images being processed is selected and a head mesh is extracted from it using the method from the previous step (step 720). This head mesh is referred to as a Second Head Mesh. This step assumes that method 700 is being performed at video rates and a human head moves only a small amount between each successive video frame.

At step 730 the relative 3D rotation and translation between the Second Head Mesh and the Reference Head Mesh is computed. In certain embodiments, this is performed using Iterative Closest Point ("ICP"). ICP is a well-established algorithm to find the relative transformation, i.e. rotation and translation, that aligns or "registers" two meshes in 3D space. One article that describes ICP is Chen, Yang; Gerard Medioni (1991). "Object modelling by registration of multiple range images". Image Vision Comput. Newton, Mass., USA: Butterworth-Heinemann: pp. 145-155. ICP requires the two meshes to be roughly aligned and it then iteratively finds a best transformation that minimizes some objective measurement such as the mean distance between the vertices. ICP converges faster when the two sets are already closely aligned and the data have substantial overlaps. Unlike feature-based methods, ICP may use all data points and does not require establishing of point correspondences so it is more fault-tolerant. ICP's speed depends on the number of iterations and the closer the initial alignment, the faster the convergence speed. Method 700 tracks data points at video rates so ICP can converge very fast enabling the estimation of 3D rotation and translation to be performed in real time. The output from ICP is a transformation, i.e. the rotation and translation, which when applied to the Reference Head Mesh will align it with the Second Head Mesh. In certain embodiments, the transformation is represented in matrix format. In certain embodiments, the transformation matrix is stored along with the Second Head mesh. It is then applied, subsequently, when merging the head meshes to create a 3D Model in step 745.

Head pose data for the Second Head Mesh is then obtained by inverting the transformation matrix and extracting the rotation and translational parameters using standard formulas. For example, the rotation angle between the Second Head Mesh and the Reference Head Mesh is obtained from the transformation matrix.

It should be noted that this method does not suffer the same drift problems that certain other methods suffer that concatenate transformations computed from successive frames, thus accumulating the errors. In contrast, method 700 computes the transformation between the current frame and the Current Reference Frame. This limits accumulated errors.

In other embodiments, the transformation can be applied to the Second Head Mesh to bring it into alignment with the Reference Head Mesh enabling a composite head mesh to be computed, in real-time, i.e. on a frame-by-frame basis.

Adding Reference Frames to Extend the Estimation Range

Steps 725 to 730 are repeated to compute the head pose for all subsequent frames. However, as noted earlier, ICP only works if there is some overlap between two sets of points. Since the current frame is always registered with current reference frame, at certain rotation angles, the overlap will not be sufficient for ICP to work properly. Experiments indicate that ICP can be reliably used to compute relative orientations up to 30 degrees from the initial frame.

Thus, to extend the head pose estimation beyond that range a new reference frame is added at some interval, such as every 30 degrees of rotation, in each rotational axis. Moreover, method 700 automatically determines when to add a new reference frame based on the rotation angle of the current head mesh, referred to as the Second Head Mesh. Without any loss of generality, the following steps describe the case of adding a second reference frame only; but it may be understood that additional reference frames may be used to extend the rotational range to a full 360 degrees.

At step 735 the head pose estimation process is halted if any of the following conditions are reached: (1) it is terminated by a human operator or another computing process, (2) a pre-defined processing time is reached, or (3) a pre-defined range of head pose data is achieved, such as from −90 to 90 head rotation angles. Once the estimation process is halted processing continues at step 745. If none of the halt conditions are reached then processing continues at step 740.

At step 740 a determination is made for the current frame, i.e. the frame currently being processed, as to whether the frame has reached a threshold rotation angle from the Current Reference Frame. As discussed, a thirty degree, experimentally determined, rotation angle is typically used as the threshold value but other rotation angles may be used. This determination is made based on the rotation angle of the transformation of the Second Head Mesh. If the threshold rotation angle is reached then processing returns to step 722 where the current frame is established as the Current Reference Frame and the Second Head Mesh is established as the Reference Head Mesh. If not, then processing continues at step 725.

Each head mesh corresponds to a partial scan of the head, created from a single frame or image, and has some overlap with the adjacent head meshes. In certain embodiments, a 3D head model is next created, at step 745, by merging all the head meshes to create a single composite head mesh. This is accomplished by combining and/or removing overlapping regions. The exact overlapping regions, i.e. regions where the meshes overlap, can be found from the head pose data estimated in the previous section. Specifically, all the head meshes are transformed to the same coordinate space, such as that of the Initial Reference Frame, using the recovered head pose (rotation, translation) data from step 725 and 730. Once all the meshes are aligned in the same space, an algorithm such as Poisson Surface Reconstruction can be used to fuse them into a single composite head mesh, also referred to as a 3D head model, or face model.

At step 750, the composite head mesh, or 3D model, created in the preceding step is displayed to the subject. This step is optional, as the objective of method 700 is to build a continuous head mesh that accurately models a subject's head in 3D. The model can be exploited in a variety of ways, including display, sharing via social networks, use in consumer applications, and the like.

It may be appreciated, that the approach described in method 700 results in a head mesh and a corresponding transformation, relative to a reference frame, being generated and stored for each frame. In certain embodiments, however, it may not be necessary to use every received frame, provided that a minimum overlap between consecutive frames, as required by ICP, is available. Further, it may be appreciated that each transform is relative to a Current Reference Head Mesh. Thus, to transform a head mesh into a common 3D space it is necessary to concatenate a transform with the transforms for previous reference head meshes as well as the current head mesh.

With only two reference frames, the final transformation of any frame can be computed by at most concatenating two transformation matrices. Errors are not accumulated indefinitely, thus creating a data-drifting problem. As more reference frames are added the number of concatenations increases but it is still a small number and doesn't affect the accuracy of the head pose estimation significantly. Most applications don't need more than 90 degrees of rotation. In such case, only three concatenations need at most three concatenations of the transformation matrices are needed at most since the farthest reference frame (60 degrees) is connected to the Initial Reference Frame via only one in-between reference frame (30 degrees).

A reference mesh can be automatically replaced when a newer head mesh of the same orientation as an existing reference mesh is found. This allows the reference meshes to be continuously refreshed with a more updated mesh, which should improve tracking accuracy. To avoid increasing errors, a reference mesh should only be replaced when the newer mesh has equal or lower registration error than the one being replaced.

It may further be appreciated, that when method 600 is used to capture image sequences, that there will be an overlap between the initial sequence, which in certain embodiments corresponds to 90 degrees from the frontal position, and the next sequence during which the subject rotates his/her head back in the opposite direction. There are various ways to handle this redundancy. In certain embodiments, redundant, i.e. overlapping, images are used to increase the signal-to-noise ratio of the captured images using established techniques such as image averaging. In other embodiments, redundant portions of images can be discarded.

Error Reporting and Auto Recovery from Tracking Failures

Head pose estimator 422 uses the ICP registration error, usually the average distance from the points in a mesh to those in a reference mesh, to determine an estimation confidence value and reports that to session controller 424. The confidence value is inversely proportional to the amount of error. Session controller 424 can choose to discard head pose data with a low confidence value to avoid generating incorrect actions from a wrong head pose.

The above tracking works because it is assumed that the user's head moves smoothly in 3D and the current location can be estimated from the previous location and the transformation. The assumption no longer holds if the user moves rapidly or completely out of sight of the camera. In this case, it is no longer possible to continue the tracking using the previous estimate. Head pose estimator 422 can detect when such failures happen by examining the registration error. When the error exceeds certain threshold, a new search is conducted to look for the head region in the entire frame using face detection as in Step 1. Once a frontal face is detected again, a head mesh can be extracted and then registered with the Initial Head Mesh to compute its transformation and the process can then resume.

A problem may occur when there are multiple faces in the frame. The face detection may find more than one face. To resume tracking of the right subject, the head pose estimator can extract a head mesh from each of the found face region. Each of the head meshes is then compared with the Initial Head Mesh to compute a transformation and an error metric for the registration. The head mesh that has the lowest error metric within a prescribed error threshold is deemed the correct subject and the tracking is resumed.

Saving of 3D Head Model or Head Meshes for User Recognition

The reference head meshes computed using method 700 represents a continuous 3D model of a subject's head. Each head mesh covers a scan of the head from a single direction and has some overlap with adjacent meshes. The head meshes are typically combined at step 765 into a single 3D head model.

The reference head meshes and/or the 3D head model can be saved for later use to recognize a returning user. In one embodiment, the head pose tracking will only start when a particular user is recognized. When an Initial Head Mesh is detected and created in Step 1, it can be registered with saved reference head meshes or 3D head models of all subjects for whom head meshes have been created, referred to as candidate subjects. The candidate subject whose initial head mesh has the lowest registration error, and where the registration error is within a prescribed threshold, may be recognized as the returning user and all of the user's stored reference meshes can be retrieved to initialize the tracking sessions. In this way, the tracking can start with reference meshes from a previous session. The reference meshes can be updated and saved again during the current session as stated before.

To reduce the data size of stored reference meshes, the head meshes can be stored at a lower resolution and/or applied with some standard data compression method.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for estimating the pose of a human subject's head from a sequence of images received from a single depth camera, comprising:
   receiving a first sequence of images from a single depth camera, wherein the images correspond to a first side of a human subject's head;
   for each of the first sequence of images, generating a head mesh that estimates head pose, wherein the head mesh that corresponds to the first image in the sequence is an initial pose;
   determining, based on the generated head meshes, that that the subject's head or the single depth camera has rotated, relative to the initial pose, to a threshold angle in a first direction;
   receiving a second sequence of images from the depth camera, wherein the images correspond to a second side of the subject's head;
   for each of the second sequence of images, generating a head mesh that estimates head pose; and
   merging the head meshes to create a 3D model of the head of the subject.

2. The method of claim 1, further comprising:
   initiating tracking by automatically detecting that the face of a human subject is positioned in a frontal orientation within the field of view of the depth camera.

3. The method of claim 1, further comprising:
   receiving an explicit command to initiate tracking.

4. The method of claim 1 further comprising:
   providing a first instruction to the subject regarding the first sequence of images; and
   providing a second instruction to the subject regarding the second sequence of images.

5. The method of claim 1 further comprising automatically determining that the capture process is complete and then initiating the merging of head meshes.

6. The method of claim 1 wherein the first sequence of images corresponds to a left or right side of the subject's face and the second sequence of images corresponds to the opposite side of the subject's face.

7. The method of claim 1 wherein the first sequence of images and the second sequence of images comprise frames of depth data and color data and wherein the 3D model of the head includes color data.

8. The method of claim 1 wherein merging the head meshes comprises merging the head meshes generated for the first sequence of images with the head meshes generated for the second sequence of images.

9. The method of claim 1 comprising:
  receiving a third sequence of images from the depth camera wherein the third sequence of images corresponds to either the top of the subject's head or the underside of the chin; and
  generating a head mesh that estimates head pose for each of the third sequence of images.

10. The method of claim 1 wherein generating a head mesh for a received sequence of images comprises:
  establishing a reference frame from one of images received from the depth camera;
  extracting a reference head mesh from the reference frame;
  for each additional received image in the sequence of images:
    extracting a second head mesh from a second received image, the second received image being received after the reference frame; and
    computing the relative rotation and translation in three dimensions between the second head mesh and the reference head mesh.

11. A system for estimating the pose of a human subject's head from a sequence of images received from a single depth camera, comprising
  a single depth camera that captures a sequence of depth and color images; and
  a processing device that:
    receives a first sequence of images from the depth camera wherein the images correspond to a first side of a human subject's head;
    for each of the first sequence of images, generates a head mesh that estimates head pose, wherein the head mesh that corresponds to the first image in the sequence is an initial pose;
    determines, based on the generated head meshes, that that the subject's head or the single depth camera has rotated, relative to the initial pose, to a threshold angle in the first direction;
    receives a second sequence of images from the depth camera wherein the images correspond to a second side of the subject's head;
    for each of the second sequence of images, generates a head mesh that estimates head pose; and
    merges the generated head meshes to create a 3D model of the head of the subject.

12. The system of claim 11, wherein the processing device is further operative to:
  initiate tracking by automatically detecting that the face of a human subject is positioned in a frontal orientation within the field of view of the depth camera.

13. The system of claim 11, wherein the processing device is further operative to:
  receive an explicit command to initiate tracking.

14. The system of claim 11 wherein the processing device is further operative to:
  provide a first instruction to the human subject regarding the first sequence of images; and
  provide a second instruction to the human subject regarding the second sequence of images.

15. The system of claim 11 wherein the processing device is further operative to automatically determine that the capture process is complete and then to initiate the merging of head meshes.

16. The system of claim 11 wherein the first sequence of images corresponds to a left or right side of the subject's face and the second sequence of images corresponds to the opposite side of the subject's face.

17. The system of claim 11 wherein the first sequence of images and the second sequence of images comprise frames of depth data and color data and wherein the 3D model of the head includes color data.

18. The system of claim 11 wherein merging the head meshes comprises merging the head meshes generated for the first sequence of images with the head meshes generated for the second sequence of images.

19. The system of claim 11 wherein the processing device is further operative to:
  receive a third sequence of images from the depth camera wherein the third sequence of images corresponds to either the top of the subject's head or the underside of the chin; and
  generate a head mesh that estimates head pose for each image in the third sequence of images.

20. A system for estimating the pose of a human subject's head from a sequence of images received from a single depth camera, comprising
  a single depth camera that captures a sequence of depth and color images and transmits them to a connected mobile device;
  a mobile device that:
    receives a first sequence of images from the depth camera wherein the images correspond to a first side of a human subject's head;
    for each of the first sequence of images, generates a head mesh that estimates head pose, wherein the head mesh that corresponds to the first image in the sequence is an initial pose;
    determines, based on the generated head meshes, that that the subject's head or the single depth camera has rotated, relative to the initial pose, to a threshold angle in the first direction;
    receives a second sequence of images from the depth camera wherein the images correspond to a second side of the subject's head;
    for each of the second sequence of images, generates a head mesh that estimates head pose; and
    merges the generated head meshes to create a 3D model of the head of the subject.

21. The system of claim 20 wherein the mobile device is further operative to:
  initiate tracking by automatically detecting that the face of a human subject is positioned in a frontal orientation within the field of view of the depth camera.

22. The system of claim 20, wherein the mobile device is further operative to:
  receive an explicit command to initiate tracking.

23. The system of claim 20 wherein the mobile device is further operative to:
- provide a first instruction to the subject regarding the first sequence of images; and
- provide a second instruction to the subject regarding the second sequence of images.

24. The system of claim 20 wherein the mobile device is further operative to automatically determine that the capture process is complete and then to initiate the merging of head meshes.

25. The system of claim 20 wherein the first sequence of images corresponds to a left or right side of the subject's face and the second sequence of images corresponds to the opposite side of the subject's face.

26. The system of claim 20 wherein the first sequence of images and the second sequence of images comprise frames of depth data and color data and wherein the 3D model of the head includes color data.

27. The system of claim 20 wherein merging the head meshes comprises merging the head meshes generated for the first sequence of images with the head meshes generated for the second sequence of images.

28. The system of claim 20 wherein the mobile device is further operative to:
- receive a third sequence of images from the depth camera wherein the third sequence of images corresponds to either the top of the subject's head or the underside of the chin; and
- generate a head mesh that estimates head pose for each image in the third sequence of images.

* * * * *